(12) United States Patent
Kimura et al.

(10) Patent No.: US 7,483,224 B2
(45) Date of Patent: Jan. 27, 2009

(54) OPTICAL SHEET

(75) Inventors: Kiyohiro Kimura, Miyagi (JP); Jun Sasaki, Miyagi (JP); Makoto Aoki, Miyagi (JP); Yasuyuki Kudo, Miyagi (JP); Mariko Fukuda, Miyagi (JP); Yu Andrew Chakchung, Miaygi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/099,527

(22) Filed: Apr. 8, 2008

(65) Prior Publication Data

US 2008/0259612 A1    Oct. 23, 2008

Related U.S. Application Data

(62) Division of application No. 11/470,877, filed on Sep. 7, 2006.

(30) Foreign Application Priority Data

| May 8, 2006 | (JP) | .............................. 2006-129633 |
| Sep. 5, 2006 | (JP) | .............................. 2006-240839 |

(51) Int. Cl.
*G02B 5/04* (2006.01)
*G02B 7/18* (2006.01)

(52) U.S. Cl. .................. 359/831; 359/833; 359/837

(58) Field of Classification Search .......... 359/831–837
See application file for complete search history.

(56) References Cited

U.S. PATENT DOCUMENTS

2006/0066537 A1 * 3/2006 Kimura et al. ................ 345/76

FOREIGN PATENT DOCUMENTS

JP    2005-38144    * 2/2005

\* cited by examiner

*Primary Examiner*—Joshua L Pritchett
(74) *Attorney, Agent, or Firm*—Bell, Boyd & Lloyd LLP

(57) ABSTRACT

A lens film with small warpage even when a transparent base is thin is provided. Pole prisms made of a hardening resin are arranged along the extending direction on a transparent base made of a flexible material. The transparent base has a depression according to a valley between the pole prisms adjacent to each other. The pole prism has a sloping face extending to an inner wall of the depression. The transparent base is in contact with the valley. A layer not functioning as a prism, that is, a so-called skirt layer does not exist between the transparent base and the pole prisms.

9 Claims, 12 Drawing Sheets

OPTICAL SHEET

CROSS REFERENCES TO RELATED APPLICATIONS

The present invention contains subject matter related to Japanese Patent Application JP 2006-129633 filed in the Japanese Patent Office on May 8, 2006, and Japanese Patent Application JP 2006-240839 filed in the Japanese Patent Office on Sep. 5, 2006, and is a divisional of U.S. patent application Ser. No. 11/470,877 filed on Sep. 7, 2006, the entire contents of which being incorporated herein by references.

BACKGROUND OF THE INVENTION

1. Field of the Invention

The present invention relates to an optical sheet having convex shape on the surface, a method for producing it, and a display apparatus including the optical sheet.

2. Description of the Related Art

In these years, cathode ray tubes (CRT), which were a mainstream of display apparatuses in the past, have been replaced by liquid crystal display apparatuses, since the liquid crystal display apparatuses have advantages such as low electrical power consumption, space-saving feature, and low cost.

There are several types of the liquid crystal display apparatuses when categorized by, for example, illumination methods in displaying images. As a representative example, a transmissive display apparatus which displays images by utilizing a light source arranged behind a liquid crystal panel can be cited.

In mobile products driven by a battery including such a display apparatus, the electrical power consumption of the display apparatus is enormously large, which is an obstacle to extend battery life. Specially, the ratio of the electrical power consumption of the backlight used in the display apparatuses is enormously large. Therefore, by reducing the electrical power consumption as much as possible, the battery life can be extended. In the result, practical values of the mobile products can be improved. However, it is not preferable that the electrical power consumption of the backlight is simply reduced, since luminance of the backlight is largely lowered, and thereby visibility of screen display of the display apparatus becomes unfavorable. Therefore, some measures to reduce the electrical power consumption of the backlight without largely lowering the luminance of the backlight have been proposed.

For example, in Japanese Unexamined Utility Model Application Publication No. 3-69184, a measure that an optical sheet having a plurality of pole prisms on the surface is arranged between a liquid crystal panel and a light source has been disclosed. A description will be specifically given of the optical sheet by using FIG. 12 and FIG. 13.

FIG. 12 shows an example of a cross sectional structure of a transmissive display apparatus 100 including lens films 112 and 113 as the foregoing optical sheet. FIG. 13 shows an enlarged view of part of a cross section of the lens film 112. The display apparatus 100 mainly includes a liquid crystal panel 120 and an illumination system 110 (so-called backlight) arranged behind the liquid crystal panel 120 (that is, opposite side of an observer side).

The illumination system 110 includes a light source 111, the lens films 112 and 113, a diffusion sheet 114, a lamp reflector 115, an light guide plate 116, and a reflecting sheet 117. The liquid crystal panel 120 mainly includes a polarizing plate 121, a transparent substrate 122, a color filter 123, a transparent electrode 124, an orientation film 125, a liquid crystal layer 126, an orientation film 127, a transparent pixel electrode 128, a transparent substrate 129, and a polarizing plate 130 in this order from the observer side.

In the display apparatus 100, light emitted from the light source 111 is reflected by the lamp reflector 115 and the reflecting sheet 117, directed in the direction of the liquid crystal panel 120, spread over the whole area of the liquid crystal panel 120 by the light guide plate 116, evenly diffused by the diffusion sheet 114, condensed by the lens films 112 and 113, and emitted to the liquid crystal panel 120. The light entering the liquid crystal panel 120 is transmitted to the observer side according to a size of a voltage applied to each pixel by a not-shown drive circuit.

As above, by arranging the lens films 112 and 113 between the liquid crystal panel 120 and the diffusion sheet 114, light emitted from the light source 111 can efficiently enter the liquid crystal panel 120. In the result, the electrical power consumption of the backlight can be reduced without largely lowering luminance of the backlight.

For example, as described in Japanese Unexamined Patent Application Publication Nos. 4-356746, 5-314545, 5-325272, and 6-47806, the lens films 112 and 113 can be produced by coating a transparent base with an uncured hardening resin, pressing a mother die having a reversal shape of pole prisms onto the hardening resin, and curing the hardening resin in such a state to transcribe the pole prism shape.

SUMMARY OF THE INVENTION

However, in the lens film obtained by the foregoing manufacturing method, the lens film is largely warped to the hardening resin side due to shrinkage due to curing of the hardening resin. In particular, when the transparent base is thin, strength of the transparent base is lowered, and a ratio of shrinkage due to curing of the hardening resin is increased. In the result, the optical sheet is significantly warped to the hardening resin side. Even when large warpage is generated in the lens film as above, it is possible to press the warpage to arrange the lens film in the display apparatus. However, after the lens film is arranged in the display apparatus, the lens film is in contact with other optical parts in adjacent thereto in part due to the warpage. Therefore, there has been a disadvantage that Newton rings, flaws and the like are thereby generated, and the display quality of the display apparatus is lowered.

In view of the foregoing problem, in the present invention, it is desirable to provide an optical sheet with small warpage even in the case of a thin transparent base, a method for producing the optical sheet, and a display apparatus including the optical sheet.

An optical sheet of an embodiment of the invention is the one in which pole prisms made of a hardening resin are arranged along an extending direction on a transparent base made of a flexible material. Here, the transparent base is in contact with a valley between the pole prisms adjacent to each other. A display apparatus of an embodiment of the invention is the one including a panel, a light source emitting light for illuminating the panel, and one or a plurality of the optical sheets provided between the panel and the light source.

In the optical sheet and the display apparatus of the embodiment of the invention, the transparent base is in contact with the valley between the pole prisms adjacent to each other. Therefore, a layer not functioning as a prism, that is, a so-called skirt layer does not exist between the transparent base and the pole prism. Here, the expression "skirt layer does not exist" is a concept including a case that no skirt layer exists and a case that the skirt layer remains slightly (for example, 0.28 μm or less) due to an error in manufacturing or the like. Thereby, the height of the pole prism from the surface of the transparent base becomes the bare minimum, and a volume of the hardening resin becomes smaller than a case that the skirt layer exists. Further, since no skirt layer exists, there is almost no portion where the adjacent pole prisms are in contact with each other.

According to an embodiment of the invention, there is provided a method for producing an optical sheet including the following steps A to D:

A: a step of arranging an uncured hardening resin on a transparent base made of a flexible material;

B: a step of pressing a mother die having projections onto the hardening resin, and pressing tops of the projections onto the transparent base until the tops of the projections are in contact with the transparent base;

C: a step of forming the hardening resin by curing the hardening resin in a state that the projections are pressed onto the transparent base; and D: a step of peeling the formed hardening resin from the mother die together with the transparent base.

In the method for producing an optical sheet of the embodiment of the invention, not only the projections of the mother die are pressed onto the hardening resin, but also the projections are pressed onto the transparent base. Therefore, a layer not functioning as a prism, that is, a so-called skirt layer does not exist between the transparent base and the pole prism. Thereby, the height of the pole prism from the surface of the transparent base becomes the bare minimum, and a volume of the hardening resin becomes smaller than the case that the skirt layer exists. Further, since no skirt layer exists, there is almost no portion where the adjacent pole prisms are in contact with each other.

According to the optical sheet, the method for producing the same, and the display apparatus of the embodiment of the invention, there is no skirt layer between the transparent base and the pole prism. Therefore, the volume of the hardening resin becomes smaller than the case that the skirt layer exists. Thereby, warpage of the optical sheet caused by shrinkage due to curing of the hardening resin can be largely decreased. Further, since there is almost no portion where the adjacent pole prisms are in contact with each other, strain caused by shrinkage due to the curing of the hardening resin is not organically bonded. Thereby, almost all warpages of the optical sheet can be eliminated. As a result, even in a case of having the transparent base thin, the optical sheet with small warpage can be realized. By arranging such an optical sheet with small warpage in the display apparatus, there is no possibility that Newton rings, flaws and the like are generated, and the display quality of the display apparatus can be improved.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings.

Figure 1:
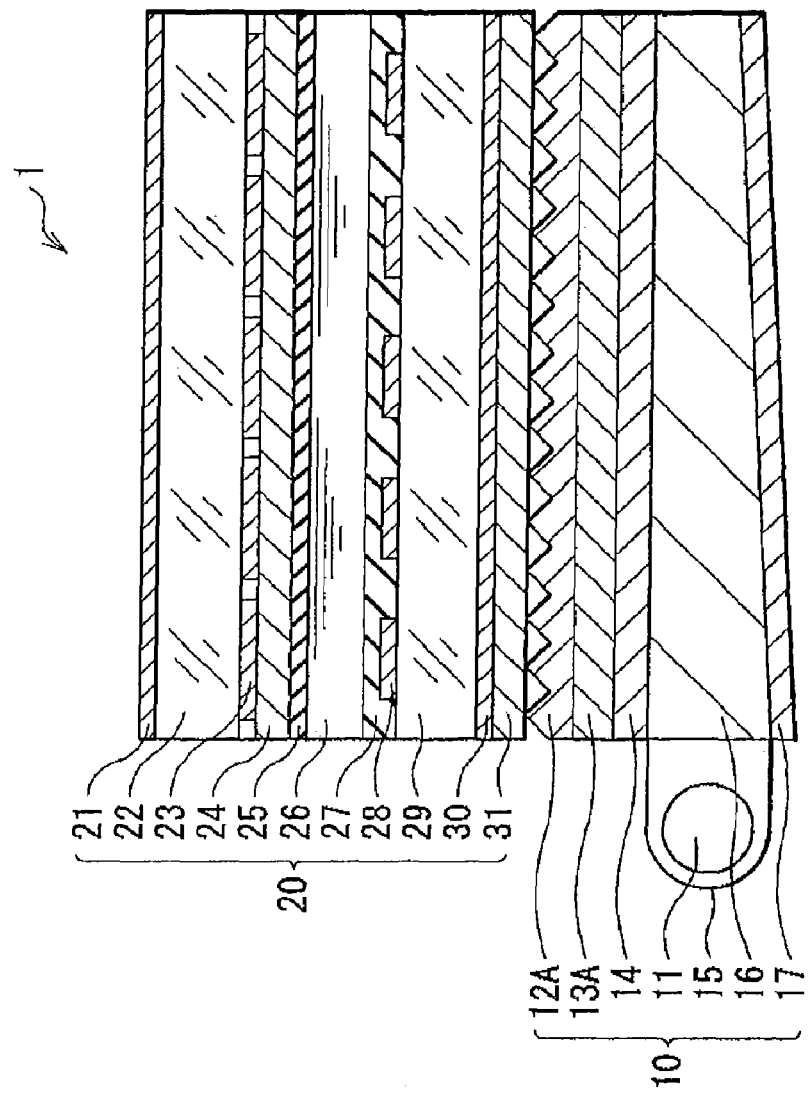
FIG. 1 is a cross section showing an example of a structure of a display apparatus of an embodiment of the invention.

FIG. 1 shows a cross sectional structure of a display apparatus 1 of an embodiment of the invention. The display apparatus 1 is a transmissive display apparatus for displaying an image by active matrix drive. The display apparatus 1 includes a liquid crystal panel 20 and an illumination system 10 arranged behind the liquid crystal panel 20.

The liquid crystal panel 20 has a laminated structure having a liquid crystal layer 26 between a transparent substrate 22 on an observer side and a transparent substrate 29 on the illumination system 10 side. Specifically, the liquid crystal panel 20 has a polarizing plate 21, the transparent substrate 22, a color filter 23, a transparent electrode 24, an orientation film 25, the liquid crystal layer 26, an orientation film 27, a transparent pixel electrode 28, a transparent substrate 29, a polarizing plate 30, and a diffusion sheet 31 in this order from the observer side.

The polarizing plates 21 and 30 are a kind of optical shutter, and let through only light (polarization) in a certain oscillation direction. The polarizing plates 21 and 30 are respectively arranged so that the polarizing axes are different from each other by 90 deg. Thereby, light emitted from the illumination system 10 is transmitted through or blocked by the liquid crystal layer 26.

The transparent substrates 22 and 29 are made of a substrate transparent to visible light such as a plate glass. Though not shown, on the transparent substrate 29 on the illumination system 10 side, an active drive circuit including a TFT (Thin Film Transistor) as a drive device electrically connected to the transparent pixel electrode 28, wiring and the like is formed.

In the color filter 23, color filters for respectively color-separating light emitted from the illumination system 10 into three primary colors of red (R), green (G), and blue (B) are arranged.

The transparent electrode 24 is made of, for example, ITO (Indium Tin Oxide), and functions as a common opposed electrode.

The orientation films 25 and 27 are made of, for example, a polymer material such as polyimide, and perform orientation for the liquid crystal.

The liquid crystal layer 26 is made of, for example, VA (Vertical Alignment) mode liquid crystal, TN (Twisted Nematic) mode liquid crystal, or STN (Super Twisted Nematic) mode liquid crystal. The liquid crystal layer 26 has a function to transmit or block light emitted from the illumination system 10 for every pixel by a voltage applied from a not-shown drive circuit.

The transparent pixel electrode 28 is made of, for example, ITO, and functions as an electrode for each pixel.

The diffusion sheet 31 has a function to diffuse light emitted from the illumination system 10 in the same manner as a diffusion sheet 14 (described later), and decrease light unevenness. The diffusion sheet 31 is provided according to needs.

The illumination system 10 has: a lamination structure in which lens films 12A and 13A (optical sheet), a diffusion sheet 14, a light guide plate 16, and a reflecting sheet 17 are layered in the order from the observer side; a light source 11 arranged on the side face of the lamination structure; and a lamp reflector 15 arranged around the light source 11. Part of the lamp reflector 15 is opened toward the laminated structure. As above, the illumination system 10 has a so-called edge-light structure.

The light source 11 is formed of a cold cathode fluorescent lamp called CCFL, a light emitting diode (LED) or the like.

The lamp reflector 15 has a function to reflect part of light emitted from the light source 11 in the direction of the light guide plate 16. Thereby, light emitted from the light source 11 can be effectively utilized.

The light guide plate 16 has a function to totally reflect and concurrently propagate light emitted from the light source 11, and to spread the light over the whole area of the liquid crystal panel 20. Thereby, light emitted from the light source 11 can become flat light.

The reflecting sheet 17 has a function to reflect light to be leaked from the light guide plate 16 toward inside of the light guide plate 16. Thereby, as with the foregoing lamp reflector 15, light emitted from the light source 11 can be effectively utilized.

The diffusion sheet 14 has a function to diffuse flat light spread over the whole area of the liquid crystal panel 20 by the light guide plate 16 and to decrease light unevenness. Thereby, the whole area of the liquid crystal panel 20 is illuminated with light with uniform brightness.

Figure 2A:
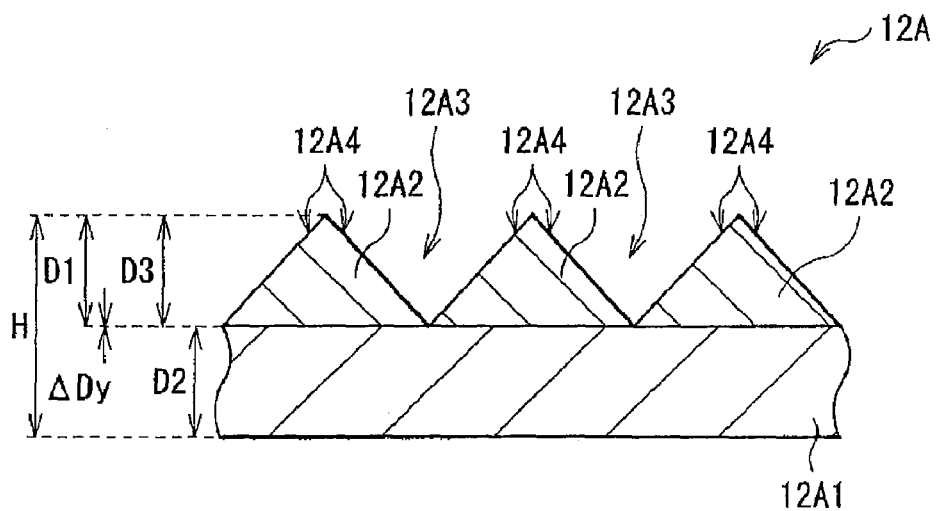
FIG. 2A is a cross section showing an example of a structure of an upper-side lens film.
Figure 2B:
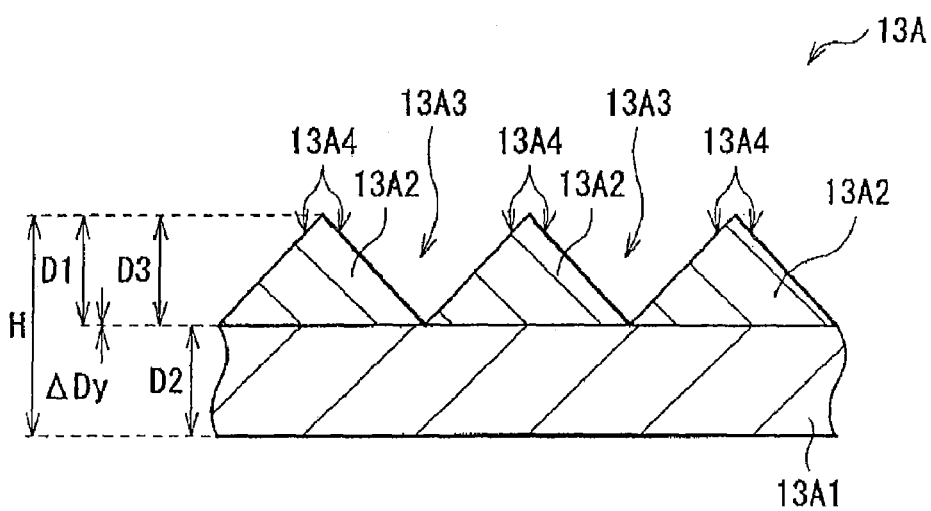
FIG. 2B is a cross section showing an example of a structure of a lower-side lens film.

The lens films 12A and 13A are, for example, as shown in enlarged views thereof in part in FIGS. 2A and 2B, respectively structured in a manner that pole prisms 12A2 (13A2) having triangle pole shape are arranged on a transparent base 12A1 (13A1) in the extending direction. A stripe-shaped valley 12A3 (13A3) with a depth D1 is provided between the adjacent pole prisms 12A2 (13A2). The pole prism 12A2 (13A2) has a sloping face 12A4 (13A4) extending to the surface of the transparent base 12A1 (13A1). The pole prism 12A2 and the pole prism 13A2 are arranged so that respective extending directions cross each other (for example, cross each other by 90 deg) and have a function to align and direct light direction in the direction of the liquid crystal panel 20.

Here, the transparent base 12A1 (13A1) is a transparent resin sheet with a thickness D2 made of a flexible material. The valley 12A3 (13A3) is in contact with the plane surface of the transparent base 12A1 (13A1). That is, no skirt layer exists between the transparent base 12A1 (13A1) and the pole prism 12A2 (13A2). Here, "no skirt layer exists" includes a case that no skirt layer exists and a case that a skirt layer remains slightly (for example, under 0.28 µm) due to an error in manufacturing or the like. That is, a thickness $\Delta Dy$ of the skirt layer is totally 0 or an extremely small value. A distance D3 between a bottom face and a top of the pole prism 12A2 (13A2) (that is, a height of the pole prism 12A2 (13A2)) is totally equal to or almost equal to the depth D1 of the valley 12A3 (13A3).

Figure 3A:
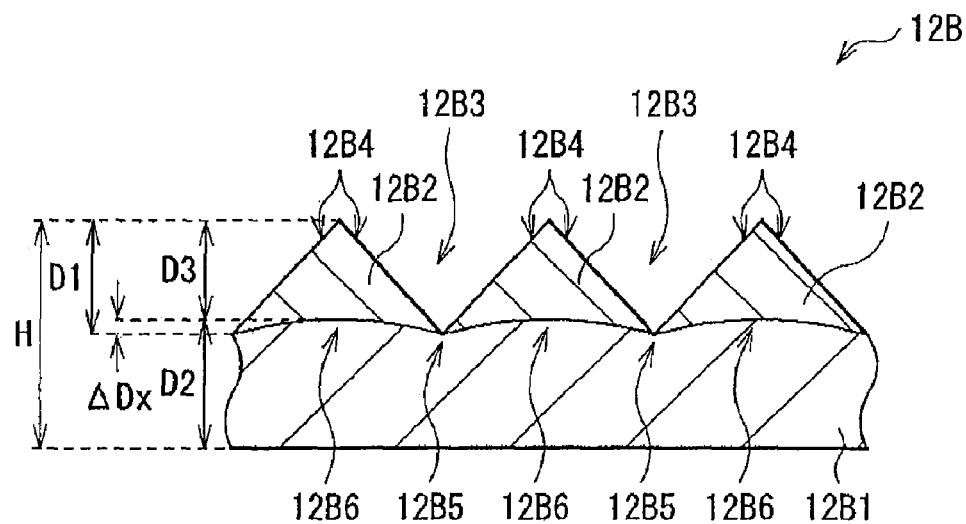
FIG. 3A is a cross section showing an example of another structure of the upper-side lens film.
Figure 3B:
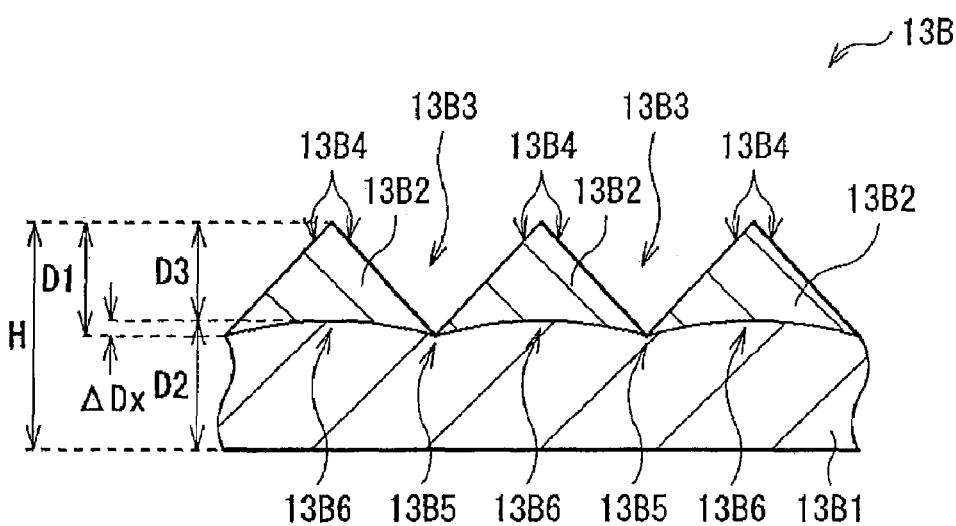
FIG. 3B is a cross section showing an example of another structure of the lower-side lens film.

Instead of the transparent base 12A1 (13A1), as shown in FIGS. 3A and 3B, it is possible to provide a transparent base 12B1 (13B1) having depressions 12B5 (13B5) with a depth $\Delta Dx$ (D1−D3) cyclically and having a convex curved face 12B6 (13B6) between the adjacent depressions 12B5 (13B5). However, in this case, a pole prism 12B2 (13B2) having a slope face 12B4 (13B4) extending to the inner wall of the depression 12B5 (13B5) of the transparent base 12B1 (13B1) and contacting with the surface of the transparent base 12B (13B1), and having a concave curved face contacting with the convex curved face 12B6 (13B6) on the transparent base 12B1 (13B13) side is provided on the transparent base 12B1 (13B1). There is no gap between the transparent base 12B1 (13B1) and the pole prism 12B2 (13B2). Therefore, a lens film 12B (13B) having the pole prism 12B2 (13B2) on the transparent base 12B1 (13B1) includes no skirt layer. Here, the distance D3 between the concave curved face of the pole prism 12B2 (13B2) and the top (that is, a height of the pole prism 12B2 (13B2)) is smaller than the depth D1 of the trough 12B3 (13B3).

For simplifying descriptions, the transparent bases 12A1 (13A1), 12B1 (13B1) will be hereinafter generically named the transparent base 12A1 or the like. Other elements will be also hereinafter generically named in the same manner.

For the foregoing flexible material, a material having resistance or transmittance to energy used for forming the pole prism 12A2 or the like in the manufacturing process can be cited. For example, when the pole prism 12A2 or the like is formed by using active energy lines such as an ultraviolet ray and an electron ray, materials which transmit the active energy lines, for example, a polyester resin, an acrylic resin, a polycarbonate resin, a vinyl chloride resin, a polymethacrylic imide resin are preferable.

The pole prism 12A2 or the like is made of a hardening resin which is cured by heating or irradiating active energy lines such as an ultraviolet ray and an electron ray. As a hardening resin, for example, polyesters, an epoxy resin, a (meta) acrylate resin such as polyester (meta) acrylate, epoxy (meta) acrylate, and urethane (meta) acrylate can be cited. The (meta) acrylate resin is preferable since the (meta) acrylate resin has favorable optical characteristics. Further, as a main component of the hardening resin, a polymerization initiator by the active energy lines such as polyacrylate is preferably contained. In the case that the convex curved face 12B6 (13B6) is provided on the surface of the transparent base 12B1 (13B1) (refer to FIGS. 3A and 3B), when a refractive index of the foregoing hardening resin is smaller than that of the flexible material forming the transparent base 12A1 or the like, the convex curved face 12B6 (13B6) on the surface of the transparent base 12B1 (13B1) can function as a condenser.

Next, a description will be given of an example of a method of forming the lens film 12A or the like with reference to FIGS. 4 to 6. First, a description will be given of a lens film manufacturing apparatus 30 used for forming the lens film 12A or the like.

Figure 4:
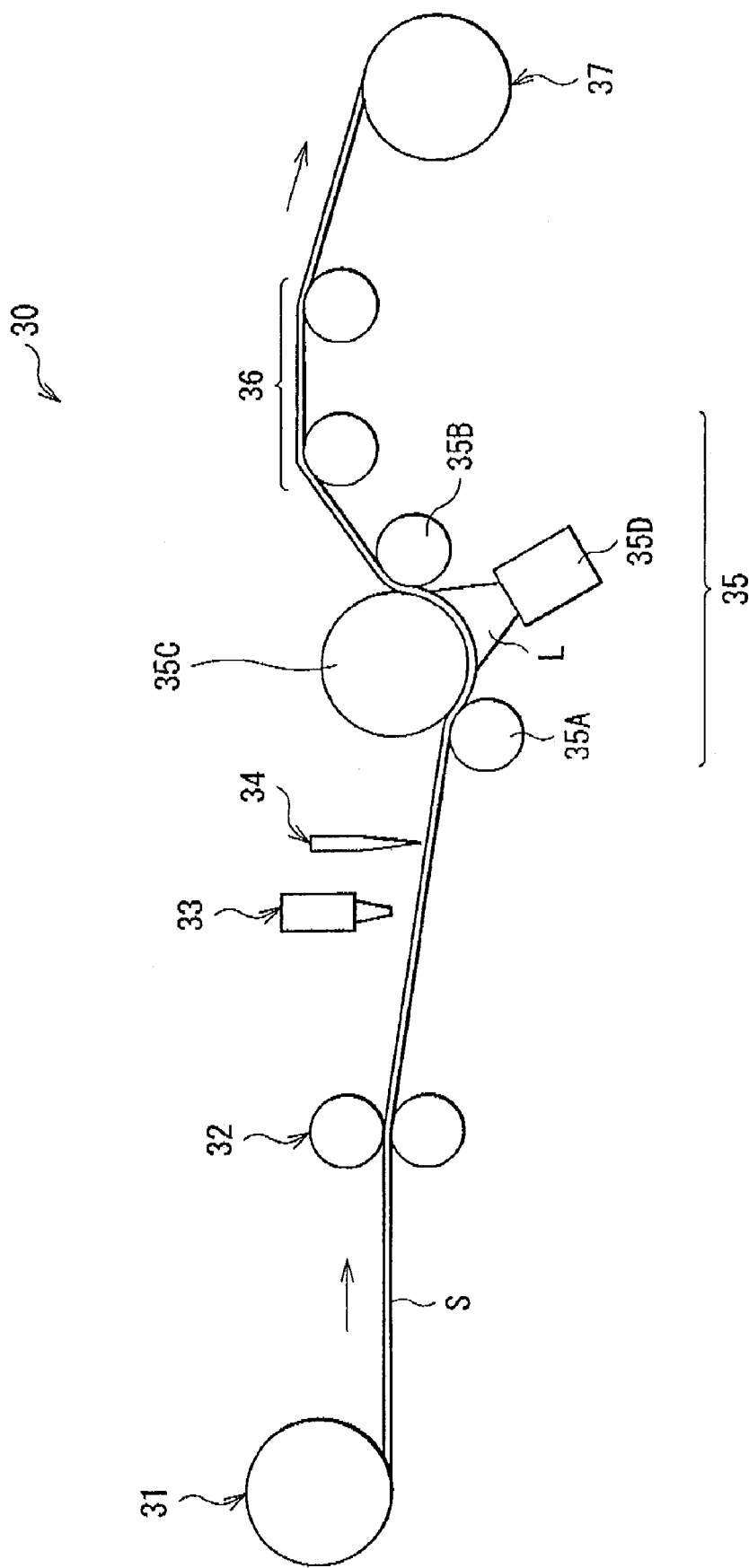
FIG. 4 is a model view showing an example of a structure of a lens film manufacturing apparatus.

FIG. 4 shows a schematic structure of the lens film manufacturing apparatus 30.

Figure 5:
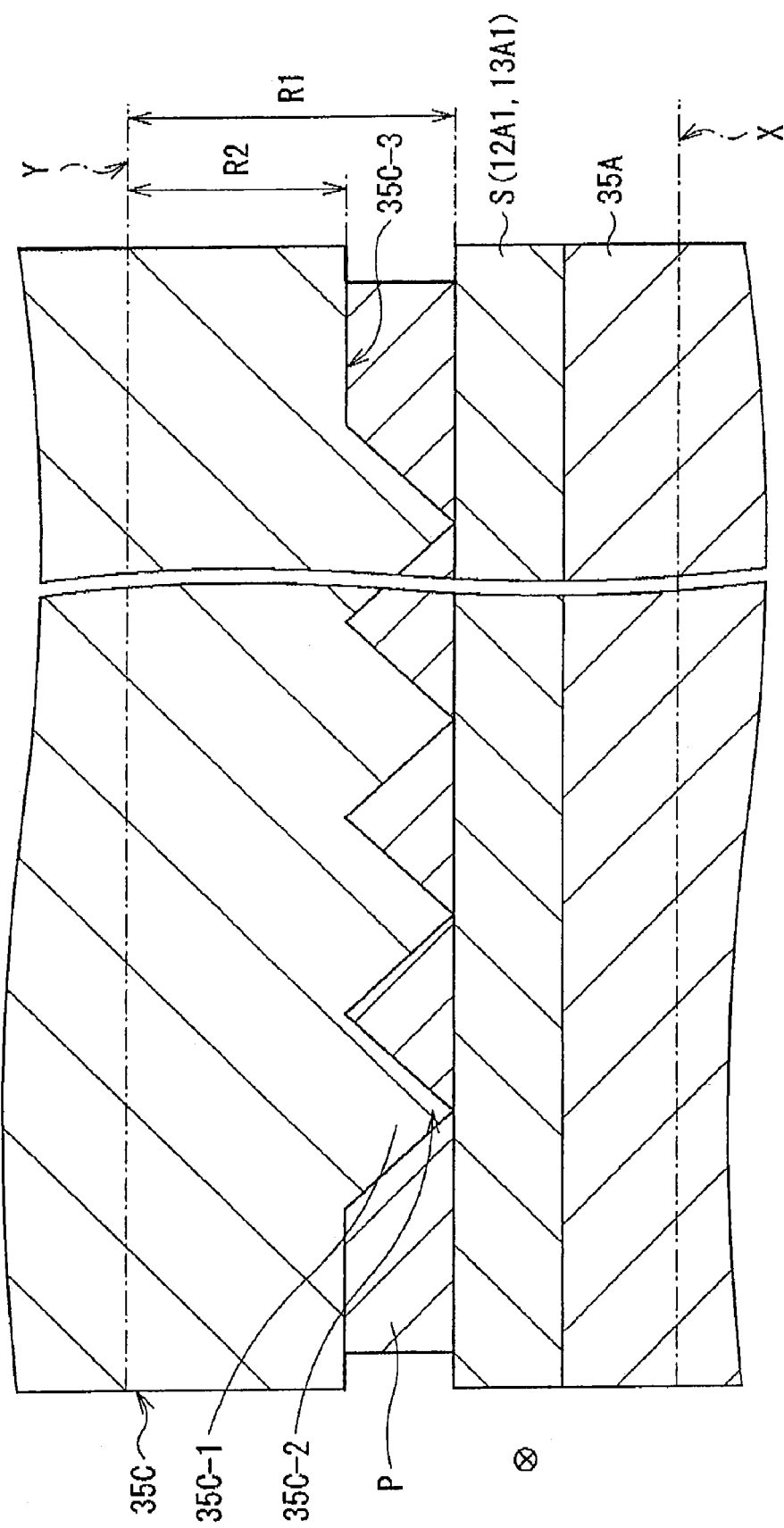
FIG. 5 is a cross section for explaining an example of operations of a transcriptional machinery of FIG. 4.

FIG. 5 shows an enlarged view of an example of a cross sectional structure in forming the lens film 12A (13A) by a transcriptional machinery 35 of FIG. 4. FIG. 6 is an enlarged view of an example of a cross sectional structure in forming the lens film 12B (13B) by the transcriptional machinery 35 of FIG. 4. In FIG. 4, a hardening resin P is not shown.

The lens film manufacturing apparatus 30 includes an unwinding device 31 for supplying a transparent base S, a speed adjustment device 32 for adjusting feed speed of the transparent base S supplied from the unwinding device 31, a resin supply device 33 for dropping the uncured hardening resin P on the transparent base S, a film thickness adjustment device 34 for adjusting a thickness of the hardening resin P dropped on the transparent base S, a transcriptional machinery 35 for transcribing a prism shape on the hardening resin P to form the lens film 12A or the like, a mold-releasing device 36 for demolding the lens film 12A or the like from the transcriptional machinery 35, and a winding device 37 for winding the lens film 12A or the like.

Here, the transcriptional machinery 35 has pressure rolls 35A and 35B which rotate centering on rotational axis X, a forming roll 35C which rotates centering on rotational axis Y parallel to the rotational axis X, and a light source 35D provided between the pressure rolls 35A and 35B.

The pressure roll 35A feeds the transparent base S to the light source 35D side while pressing the transparent base S coated with the hardening resin P with a given thickness by a given pressure from the transparent base S side in the direction of the forming roll 35C. The pressure roll 35B feeds the transparent base S from the light source 35D side to the mold-releasing device 36 side while pressing the transparent base S having the hardening resin P formed in a given shape on the surface thereof by a given pressure from the transparent base S side in the direction of the forming roll 35C.

Figure 6:
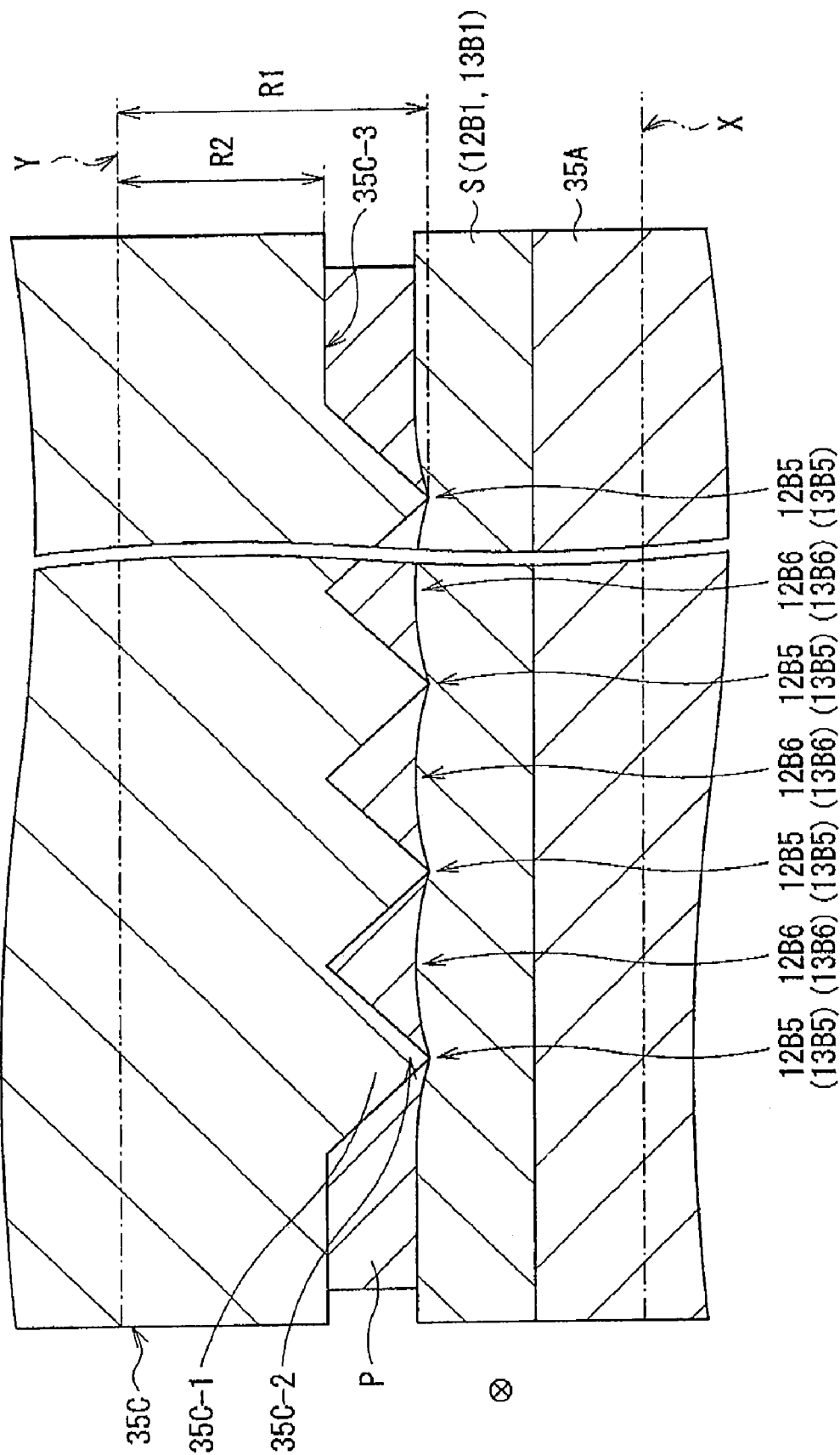
FIG. 6 is a cross section for explaining an example of operations of another transcriptional machinery of FIG. 4.

As shown in FIGS. 5 and 6, the forming roll 35C has a mother die in which pole projections 35C-1 with a reversal shape of the pole prism 12A2 or the like are arranged on the peripheral face along the extending direction. Rotational radius R2 in the portion where the projection 35C-1 is formed in the forming roll 35C (distance between the rotational axis Y of the forming roll 35C and a top 35C-2 of the projection 35C-1) is larger than rotational radius R1 in the portion where the projection 35C-1 is not formed (distance between the rotational axis Y of the forming roll 35C and a surface 35C-3 where the projection 35C-1 is not formed). Thereby, when the projection 35C-1 is pressed onto the transparent base S, there is no possibility that the surface 35C-3 not formed with the projection 35C-1 is in contact with the transparent base S. Therefore, the top 35C-2 of the projection 35C-1 can be surely pressed onto the transparent base S. Therefore, in the transcriptional machinery 35, by appropriately adjusting a pressure with which the top 35C-2 of the projection 35C-1 is pressed onto the transparent base S, a state that the top 35C-2 is in contact with the surface of the transparent base S can be maintained. Further, it is also possible that by pressing the top 35C-2 into the transparent base S, depressions and a convex curved face between adjacent depressions are formed on the surface of the transparent base S.

The light source 35D irradiates an active energy line L such as an ultraviolet ray and an electron ray from the transparent base S side to the hardening resin P pressed onto the forming roll 35C by the pressure rolls 35A and 35B.

When the foregoing lens film manufacturing apparatus 30 starts operations, the transparent base S supplied from the unwinding device 31 is adjusted to a given speed by the speed adjustment device 32, and the uncured hardening resin P is dropped on the transparent base S by the resin supply device 33. The dropped hardening resin P is adjusted to a given thickness by the film thickness adjustment device 34. The hardening resin P with the film thickness adjusted is put into the transcriptional machinery 35 with the surface thereof facing to the forming roll 35B side. Then, the hardening resin P is pressed onto the forming roll 35B from the transparent base S side by the pressure rolls 35A and 35B, and a shape of the pole prism 12A2 or the like is transcribed.

When the pole prism 12A2 (13A2) is formed, as shown in FIG. 5, pressure is applied by the pressure rolls 35A and 35B until the top 35C-2 of the projection 35B-1 is in contact with the transparent base S. Thereby, there is almost no portion where the adjacent pole hardening resin P is in contact with each other. Meanwhile, when the pole prism 12B2 (13B2) is formed, as shown in FIG. 6, pressure is applied by the pressure rolls 35A and 35B until the top 35C-2 of the projection 35B-1 is pressed into the transparent base S. Thereby, there is almost no portion where the adjacent pole hardening resin P is in contact with each other. In addition, the depression 12B5 (13B5) is formed in the pressed portion, and the convex curved face 12B6 (13B6) is formed between the adjacent depressions 12B5 (13B5).

Subsequently, light L emitted from the light source 35D is irradiated to the hardening resin P through the transparent base 12A1 or the like in a state that the top 35C-2 of the projection 35B-1 is pressed onto the transparent base 12A1 or the like. Thereby, a shape transcribed on the hardening resin P is fixed. In the result, the pole prism 12A2 (13A2) is formed on the transparent base 12A1 (13A1), and the pole prism 12B2 (13B2) is formed on the transparent base 12B1 (13B1). After that, the transparent base 12B1 or the like is released from the transcriptional machinery 35 by the mold-releasing device 36 together with the pole prism 12A2 or the like, and the released resultant is wound by the winding device 37. As above, the lens film 12A or the like of this embodiment is formed.

The deeper a depth $\Delta Dx$ of the depression 12B5 (13B5) is, the smaller a curvature radius of the curved face 12B6 (13B6) can be. However, when a pressure of the pressure rolls 35A and 35B is excessively increased to deepen the depression 12B5 (13B5), there is a possibility that the depression 12B5 (13B5) in the transparent base 12B1 (13B1) becomes white, and thus a light transmittance decreases. Therefore, the depth $\Delta Dx$ of the depression 12B5 (13B5) is preferably a depth to an extent that no whitening is caused at the transparent base 12B1 (13B1) (about 10% or less of thickness D2 of the transparent base 12B1 (13B1)).

Next, basic operations in displaying an image in the display apparatus 1 including the lens film 12A or the like formed as above will be described.

First, in the illumination system 10, part of light emitted from the light source 11 directly enters the light guide plate 16, and the rest of light thereof is reflected by the lamp reflector 15 and then enters the light guide plate 16. The light entering the light guide plate 16 is emitted from the top face of the light guide plate 16, evenly diffused by the diffusion sheet 14, oriented by the lens film 12A13, and emitted to the liquid crystal panel 20.

In the liquid crystal panel 2, incident light from the illumination system 10 is transmitted according to a size of a voltage applied for every pixel between the transparent pixel electrode 28 and the transparent electrode 24 as an opposed electrode, color-separated by the color filter 23, and emitted to the observer side. Thereby, color images are displayed.

Figure 13:
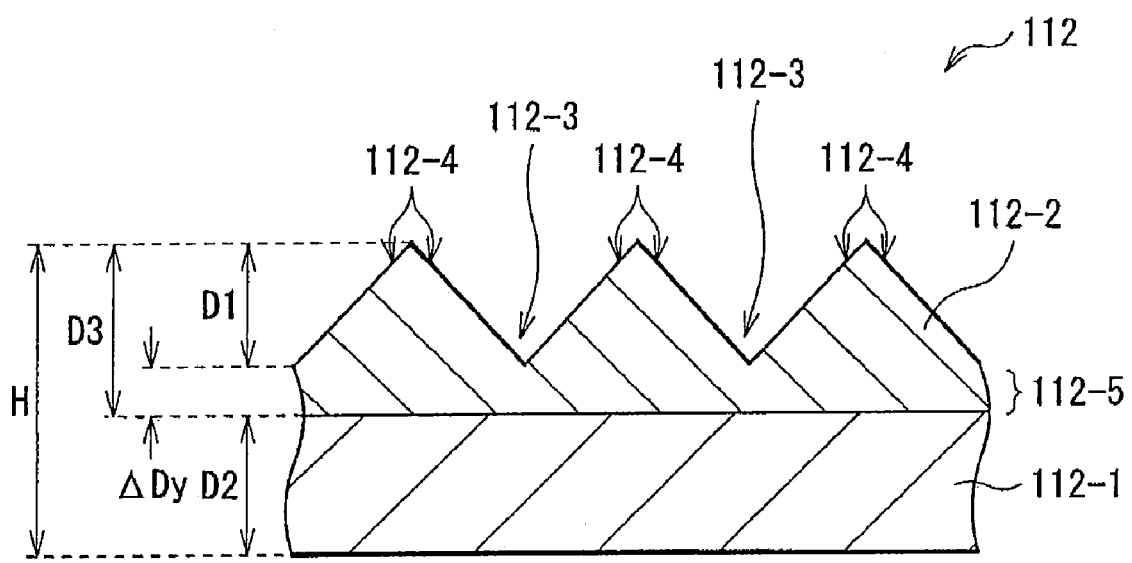
FIG. 13 is a cross section showing an example of a structure of a lens film of FIG. 12.

Next, a description will be given of effects of the lens film 12A or the like of this embodiment in comparison with the lens film 112 of related art shown in FIG. 13.

The lens film 112 of related art is different from the lens film 12A or the like of this embodiment mainly in that the lens film 112 has a pole prism 112-2 on a transparent base 112-1 with a skirt layer 112-5 in between. As described above, the skirt layer 112-5 is a layer not functioning as a prism, which is not necessary in the optical design. However, in the past, when an uncured hardening resin is cured to transcribe a shape of the pole prism 112-2, the skirt layer 112-5 having a uniform thickness is provided to prevent deterioration of transcription characteristics caused by shrinkage due to curing of the hardening resin.

Figure 7A:
FIGS. 7A and 7B are model views for explaining forms of warpage of the lens film.
Figure 7B:

However, when such a skirt layer 112-5 is provided, a volume of the uncured hardening resin necessary for forming the pole prism 112-2 is naturally increased, compared to a case in which no skirt layer 112-5 is provided. Further, the adjacent pole prisms 112-2 are in contact with each other with the skirt layer 112-5 in between, strain caused by shrinkage due to curing of the hardening resin is organically bonded. Therefore, shrinkage due to curing of the hardening resin becomes large. In the result, large warpage (warpage on the plus side) as shown in FIG. 7B is generated in the lens film 112.

Figure 8:
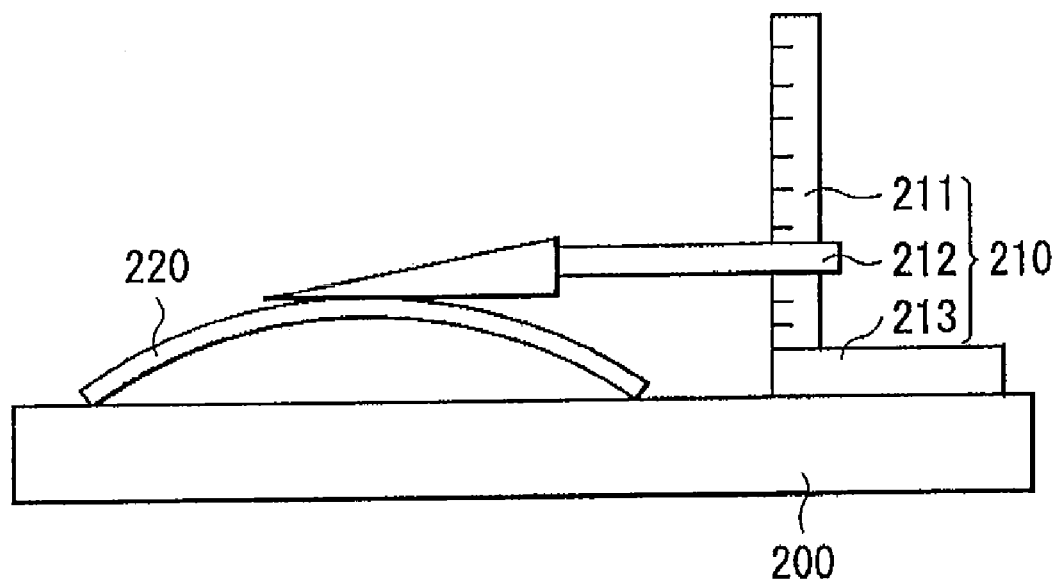
FIG. 8 is a model view showing an example of measurement method of amount of warpage of the lens film.

An amount of warpage can be, for example, measured by using a height gauge 210 arranged on a level block 200 as shown in FIG. 8. The height gauge 210 includes a scale 211 which extends in the direction perpendicular to the level block 210, a movable section 212 which is arranged movably and extends in the direction parallel to the level block 200, and a base 213 which is connected to an end of the scale 211 and supports the scale 211. A measurement target 220 is placed with the surface of the side warped in a state of a convex upward on the level block 200, the movable section 212 is quietly dropped from upward of the measurement target 220, and a scale indicated in the scale 211 from a position of the movable section 212 at a moment when the bottom face of the movable section 212 is in contact with the concave surface of the measurement target 220 is read, and thereby measurement is performed. As an apparatus allowing such measurement, for example, HD-30A of MITUTOYO can be cited. When the surface on the side formed with a prism is warped in a state of a convex as shown in FIG. 7A, it is described that being warped to the minus side. When the surface on the side opposite of the side formed with a prism (resin base side) is warped in a state of a convex as shown in FIG. 7B, it is described that being warped to the plus side.

Even when large warpage is generated in the lens film 112 as above, it is possible to press the warpage and arrange the lens film 112 in the display apparatus 1. However, when the lens film 112 is arranged in the display apparatus 1, it is often the case that the lens film 112 is partly in contact with other optical component (diffusion sheets 14 and 31) or the like adjacent thereto due to the warpage, and thereby Newton rings, flaws and the like are generated and the display quality of the display apparatus 1 is lowered. Such an issue has been largely generated particularly in the case of mobile usage in which a gap in the display apparatus 1 is slightly provided. Such a case has lead to lowering of the yield.

Meanwhile, the lens film 12A or the like of this embodiment is formed so that the valley 12A3 or the like is in contact with the transparent base 12A1 or the like by using the foregoing producing method. Thereby, the skirt layer regarded as a necessary component in the past is excluded, and a volume of the uncured hardening resin P necessary in forming the pole prism 12A2 or the like is reduced. In the result, shrinkage due to curing of the hardening resin P largely decreases. Further, since there is almost no portion where the adjacent pole prisms 12A2 or the like are in contact with each other, strain caused by shrinkage due to the curing of the hardening resin P is not organically bonded. Thereby, almost all warpages of the lens film 12A or the like can be eliminated.

Further, when the depression 12B5 (13B5) is formed by using the foregoing producing method, stress is generated in the direction opposite to the direction of stress due to shrinkage of the pole prism 12B2 (13B2) in the vicinity of the depression 12B5 (13B5) of the transparent base 12B1 (13B1). In the result, an amount of warpage generated by the lens film 12B largely decreases. Therefore, there is no possibility that Newton rings, flaws or the like are generated, and the display quality of the display apparatus 1 is significantly favorable.

Figure 9:
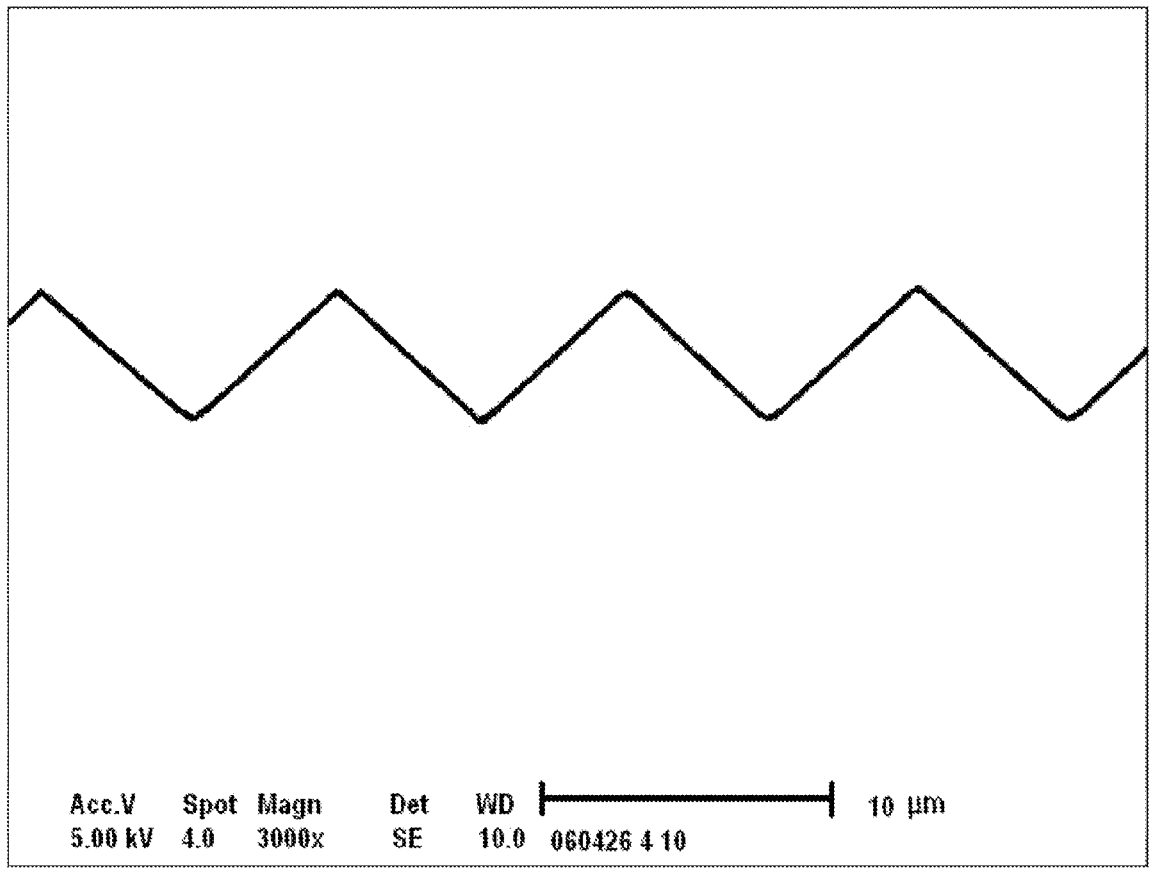
FIG. 9 is a cross sectional photograph of the lens film.

In the foregoing producing method, it has been confirmed that in transcribing a shape of the pole prism 12A2 or the like by curing the uncured hardening resin P, there is no possibility that transcription characteristics are not deteriorated by shrinkage due to curing of the hardening resin P even when no skirt layer is provided (refer to a cross sectional photograph of FIG. 9). Therefore, there is no possibility that the display quality of the display apparatus 1 is deteriorated even when no skirt layer is provided.

Further, in this embodiment, when the depression 12B5 (13B5) is formed on the surface of the transparent base 12B1 (13B1), the convex curved face 12B6 (13B6) is formed between each depression 12B5 (13B5) accordingly. Therefore, by making the curved face 12B6 (13B6) function as a condenser, front luminance can be improved.

In the field of mobile devices, display apparatuses are desired to become thinner. Each component composing the display apparatuses are demanded to become thinner as long as possible. A description will be given thereof with reference to FIG. 13. To make the lens film 112 thinner, for example, the transparent base 112-1 of the lens film 112 may be made thin. However, when the transparent base 112-1 is made thin, strength of the transparent base 112-1 is lowered, and a rate of shrinkage due to curing of a hardening resin is increased. Therefore, the lens film 112 is significantly warped to the pole prism 112-2 side. Then, the depth D1 of the valley 112-3 of the pole prism 112-2 may be made shallow instead of the transparent base 112-1. However, the depth D1 of the valley 112-3 is made simply shallow, a slope angle of the slope face 112-4 becomes small, and front luminance is lowered. Therefore, a pitch of the pole prism 112-2 should be decreased while maintaining the slope angle of the slope face 112-4 of the pole prism 112-2. However, when the pitch of the pole prism 112-2 is excessively decreased, the front luminance is decreased in reality. As a result, utility of the lens film 112 provided for the purpose of improving luminance is decreased. Therefore, it is found that in the case of FIG. 13, to make the lens film 112 thinner without decreasing front luminance, there are only the following methods. One method is to eliminate the skirt layer 112-5 located under the pole prism 112-2. The other method is to make the transparent base 112-1 thin. However, in the past, there is no idea to eliminate the skirt layer 112-5 since the skirt layer 112-5 is actively provided as described above. Meanwhile, when the transparent base 112-1 is made thin, large warpage is generated. Therefore, it has been necessary to make the transparent base 112-1 thick to some degree (for example, about 50 μm).

Meanwhile, in the lens film 12A or the like of this embodiment, the skirt layer which has been regarded as a necessary component is actively eliminated, the transparent base 12A1 or the like and the valley 12A3 or the like are in contact with each other, and portions where the adjacent triangle pole-shaped hardening resin are in contact with each other are almost eliminated. Thereby, strain generated curing and shrinkage of the adjacent triangle pole-shaped hardening resin is not organically bonded. Therefore, warpage of the lens film 12A or the like can be almost eliminated.

In the result, even when the transparent base 12A1 or the like is made thin, there is no possibility that the lens film 12A or the like is warped. Therefore, for example, it is possible that the whole thickness of the lens film 12A or the like is made thin by making the transparent base 12A1 or the like thin. Further, it is possible that front luminance is increased almost without changing the whole thickness of the lens film 12A or the like by making the transparent base 12A1 or the like thin and making the pitch of the pole prism 12A2 or the like large.

EXAMPLES

Next, a description will be given of examples of the lens film 12A or the like of this embodiment in comparison with the lens film 112 of comparative examples.

In the lens film 12A or the like according to the examples, the width (pitch) in the arrangement direction of the pole prism 12A2 or the like was 31 µm, the depth D1 of the valley 12A3 or the like was 15 µm, the angle of the top (apex angle) of the pole prism 12A2 or the like was 90 deg, and the thickness D2 of the transparent base 12A1 or the like was 50 µm. In addition, the depth of the depression 12B5 (13B5) ($-\Delta Dx(=D3-D1)$) was −4.31 µm, −3.13 µm, −2.46 µm, −2.04 µm, −1.21 µm, −0.5 µm, +0.0 µm, or +0.25 µm (refer to Table 1). The depth ($-\Delta Dx$) of +0.0 µm means that no skirt layer exists. The depth ($-\Delta Dx$) of +0.25 µm means that the skirt layer slightly remains due to an error in manufacturing or the like, that is, means that the skirt layer does not exist practically.

Meanwhile, in the lens film 112 according to the comparative examples, as in the foregoing examples, the width (pitch) in the arrangement direction of the pole prism 112-2 was 31 µm, the depth D1 of a valley 112-3 was 15 µm, the angle of the top (apex angle) of the pole prism 112-2 was 90 deg, and the thickness D2 of the transparent base 112-1 was 50 µm. In addition, the thickness of the skirt layer 112-5 ($\Delta Dy(=D3-D1)$) was +0.5 µm, +6.5 µm, +17.5 µm, +25.5 µm, or +34.5 µm (refer to Table 1).

Figure 10:
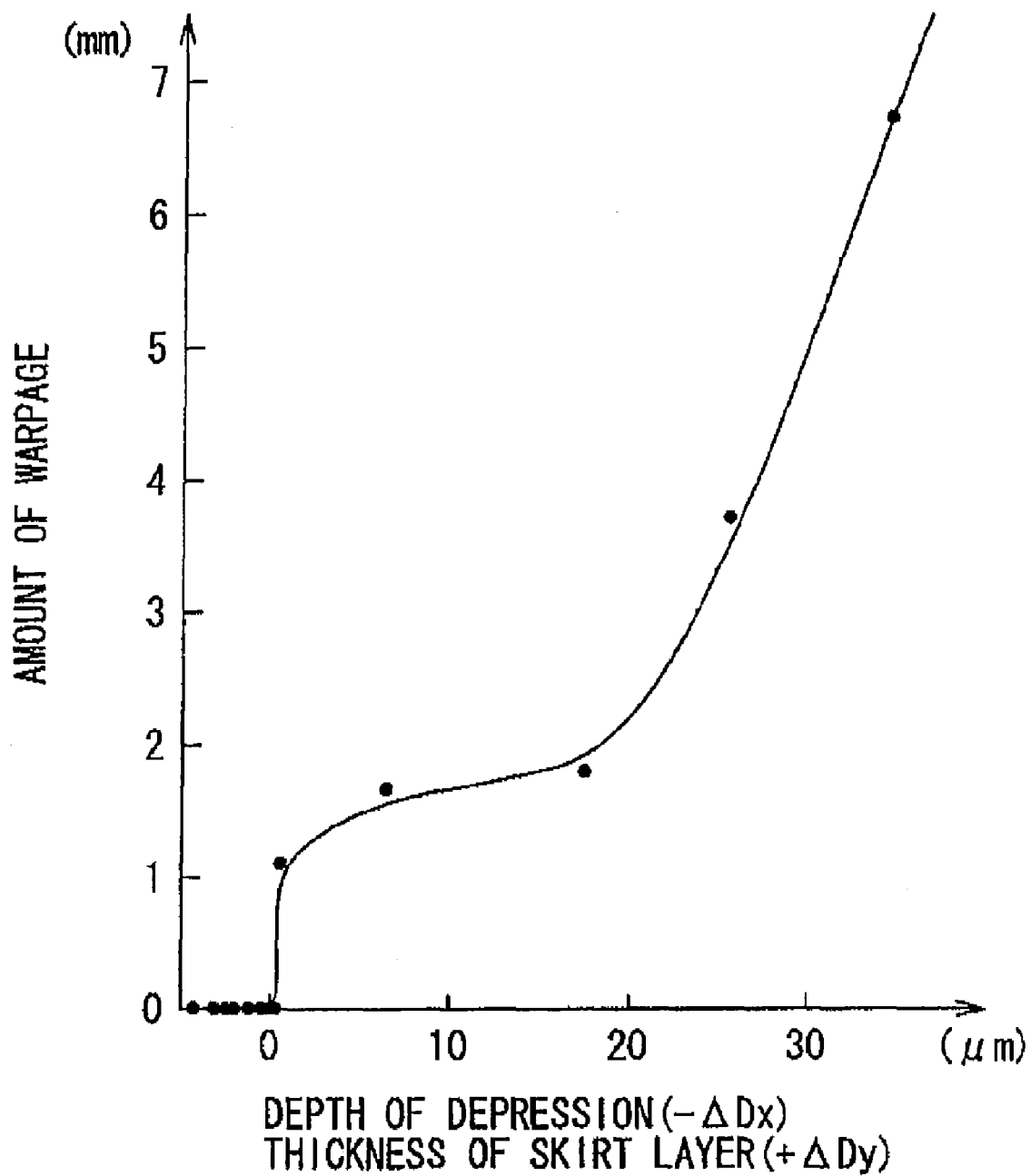
FIG. 10 is a relational view for explaining a relation between a depth of a depression or a thickness of a skirt layer and an amount of warpage.

From FIG. 10, it was found that in the examples, the amount of warpage of the lens film 12A or the like was 0 regardless of the depth of the depression 12B5 (13B5) including that the transparent base 12A1 (13A1) was in contact with the valley 12A3 (13A3). Therefore, in the examples, there is no possibility that Newton rings, flaws and the like are generated, the display quality of the display apparatus 1 is enormously favorable, and thus the examples are enormously suitable for mobile usage.

Meanwhile, it was found that in the comparative examples, the amount of warpage of the lens film 112 was extremely large, and even if the skirt layer 112-5 slightly existed, the amount of warpage of the lens film 112 was drastically increased. That is, it was found that regarding the amount of warpage, a discontinuity existed depending on the presence of the skirt layer 112-5. Therefore, in the comparative examples, there is an enormous possibility that Newton rings, flaws and the like are generated, the display quality of the display apparatus 1 is easily lowered, and thus the comparative examples are not suitable for mobile usage.

Table 2 shows relative luminance ratios of the lens film 12A or the like with the depth ($-\Delta Dx$) of −4.31 µm, −3.13 µm, −2.46 µm, −2.04 µm, or −1.21 µm where luminance of the lens film 12A or the like was 1 when the depth ($-\Delta Dx$) of the depression 12B5 (13B5) was +0.0 µm. For reference, curvature radius of the curved face 12B6 (13B6) corresponding to the depth ($-\Delta Dx$) of the depression 12B5 (13B5) are shown.

TABLE 2

| Depth of depression ($-\Delta Dx$ (µm)) | Curvature radius (µm) | Relative luminance ratio |
|---|---|---|
| −4.31 | 30 | 0.998 |
| −3.13 | 40 | 1.0245 |

TABLE 1

| | Depth of depression $-\Delta Dx$ (µm) | Thickness of skirt layer $-\Delta Dy$ (µm) | Pitch (µm) | Amount of warpage (mm) | D2 (µm) | D1 (µm) | D3 (µm) | H (µm) |
|---|---|---|---|---|---|---|---|---|
| Example | −4.31 | — | 31 | 0.0 | 50 | 15 | 10.69 | 60.5 |
| Example | −3.13 | — | 31 | 0.0 | 50 | 15 | 11.87 | 61.8 |
| Example | −2.46 | — | 31 | 0.0 | 50 | 15 | 12.54 | 62.5 |
| Example | −2.04 | — | 31 | 0.0 | 50 | 15 | 12.96 | 63.0 |
| Example | −1.21 | — | 31 | 0.0 | 50 | 15 | 13.79 | 63.8 |
| Example | −0.5 | — | 31 | 0.0 | 50 | 15 | 14.5 | 64.5 |
| Example | +0.0 | +0.0 | 31 | 0.0 | 50 | 15 | 15 | 65 |
| Example | +0.25 | +0.25 | 31 | 0.0 | 50 | 15 | 15.25 | 65.2 |
| Comparative example | — | +0.5 | 31 | 1.11 | 50 | 15 | 15.5 | 65.5 |
| Comparative example | — | +6.5 | 31 | 1.67 | 50 | 15 | 21.5 | 71.5 |
| Comparative example | — | +17.5 | 31 | 1.8 | 50 | 15 | 32.5 | 82.5 |
| Comparative example | — | +25.5 | 31 | 3.72 | 50 | 15 | 40.5 | 90.5 |
| Comparative example | — | +34.5 | 31 | 6.73 | 50 | 15 | 49.5 | 99.5 |

FIG. 10 shows a relation between the depth ($-\Delta Dx$) of the depression 12B5 (13B5) of the lens film 12A or the like according to the foregoing examples and the amount of warpage in the left side of the figure, and shows a relation between the thickness $\Delta Dy$ of the skirt layer 112-5 of the lens film 112 according to the foregoing comparative examples and the amount of warpage in the right side of the figure.

TABLE 2-continued

| Depth of depression ($-\Delta Dx$ (µm)) | Curvature radius (µm) | Relative luminance ratio |
|---|---|---|
| −2.46 | 50 | 1.0246 |
| −2.04 | 60 | 1.0270 |

TABLE 2-continued

| Depth of depression (−ΔDx (μm)) | Curvature radius (μm) | Relative luminance ratio |
|---|---|---|
| −1.21 | 100 | 1.0400 |
| 0 | 10000 | 1 |

Figure 11:
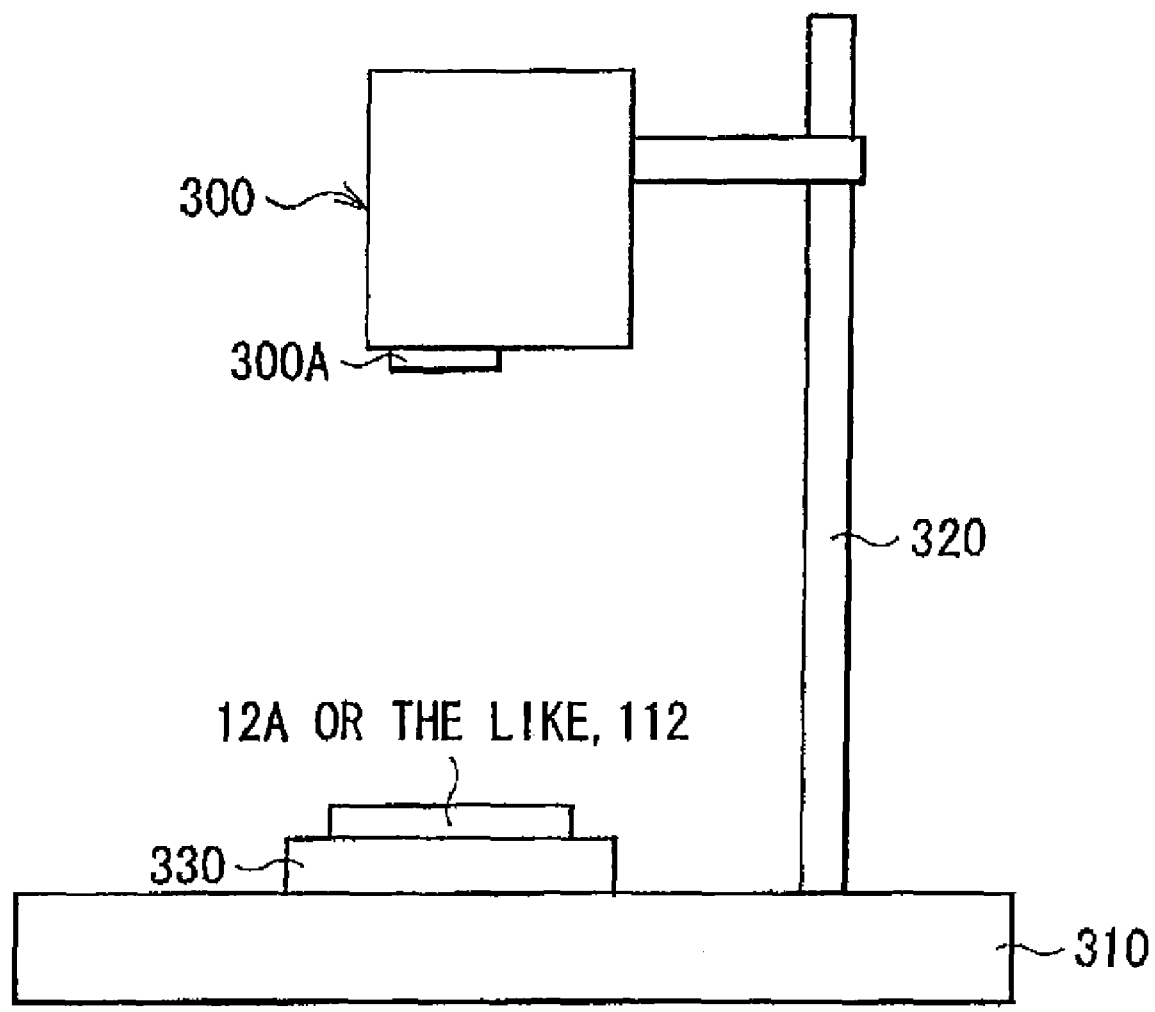
FIG. 11 is a model view showing an example of a measurement method of a relative luminance ratio of the lens film.
Figure 12:
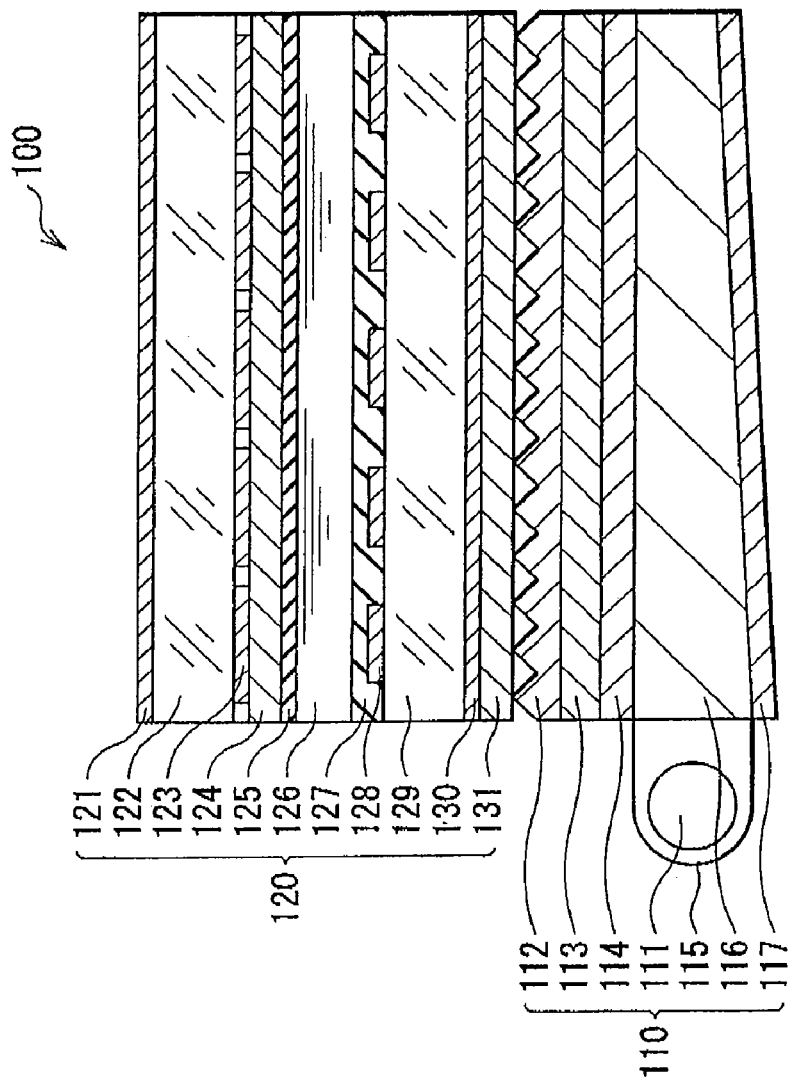
FIG. 12 is a cross section showing an example of a structure of a display apparatus of the related art.

Light luminance outputted through the lens film 12A or the like was measured by, for example, a color luminance meter 300 as shown in FIG. 11. The color luminance meter 300 is fixed on a support section 320 which is fixed on a level block 310 and extends in the direction perpendicular to the level block 310 with an aperture 300A for taking light downward. By taking in light outputted from a backlight unit 330 placed on the level block 310 from the aperture 300A, luminance of the light is measured. The lens film 12A or the like was placed on the backlight unit 330, and luminance when the backlight unit 330 was turned on was measured. Next, the lens film 12A or the like was not placed on the backlight unit 330, and luminance when the backlight unit 330 was turned on was measured. Thereby, the relative luminance ratio was obtained.

From Table 2, it was found that when the depth ΔDx of the depression 12B5 (13B5) was deepened, a range where the relative luminance ratio was larger than 1 existed. Therefore, by setting the depth (−ΔDx) of the depression 12B5 (13B5) within the range, the amount of warpage generated in the lens film 12A or the like could be largely decreased, in addition, the front luminance could be improved.

In reality, the relative luminance ratio is changed according to the size of the curvature radius. However, the size of the curvature radius when the relative luminance ratio is larger than 1 is changed according to the width (pitch) in the arrangement direction of the pole prism 12B2 (13B2), the depth D3 of the valley 12B3 (13B3), and the angle of the top (apex angle) of the pole prism 12B2 (13B2). Therefore, the depth (−ΔDx) of the depression 12B5 (13B5) with which the relative luminance ratio becomes larger than 1 is difficult to be determined categorically. As a combination frequently used practically, the depth (−ΔDx) of the depression 12B5 (13B5) with which the relative luminance ratio becomes larger than 1 is smaller than 0 μm, and about −4 μm or more, considering that the depth D3 of the valley 12B3 (13B3) is almost half of the width (pitch) in the arrangement direction of the pole prism 12B2 (13B2), and the angle of the top (apex angle) of the pole prism 12B2 (13B2) is about 90 deg.

Table 3 shows the amount of warpage when the transparent base 12A1 or the like of the lens film 12A or the like according to the examples was an existing typical thickness (50 μm) or less, and the amount of warpage when the transparent base 122-1 of the lens film 112 according to the comparative examples was an existing typical thickness (50 μm) or more. In Table 3, when the depression 12B5 (13B5) was provided, D1/D2 was used as a thickness ratio. When the depth (−ΔDx) was +0.0 μm, +0.25 μm, and +0.28 μm, and when the skirt layer 112-5 existed, D3/D2 was used as a thickness ratio.

TABLE 3

| | Pitch (μm) | D2 (μm) | D1 (μm) | D3 (μm) | H (μm) | D1/D2 (μm) | D3/D2 (μm) | −ΔDx (μm) | ΔDy (μm) | Amount of warpage (mm) |
|---|---|---|---|---|---|---|---|---|---|---|
| Example a | 34 | 25 | 15.8 | 16.1 | 41.1 | — | 0.64 | — | +0.28 | 0.0 |
| Example b | 19 | 25 | 8.6 | 8.1 | 33.1 | 0.34 | — | −0.5 | — | 0.0 |
| Example c | 34 | 25 | 15.8 | 14.8 | 39.8 | 0.63 | — | −1.0 | — | 0.0 |
| Example d | 50 | 25 | 23.3 | 22.8 | 47.8 | 1.02 | — | −0.5 | — | 0.0 |
| Example e | 34 | 50 | 15.8 | 15.3 | 65.3 | 0.32 | — | −0.5 | — | 0.0 |
| Example f | 31 | 50 | 15 | 14.5 | 64.5 | 0.3 | — | −0.5 | — | 0.0 |
| Example g | 31 | 50 | 15 | 15 | 65.0 | — | 0.3 | +0.0 | +0.0 | 0.0 |
| Example h | 34 | 50 | 15.8 | 16.1 | 65.1 | — | 0.33 | +0.25 | +0.25 | 0.0 |
| Comparative example I | 24 | 50 | 11 | 13 | 63.0 | — | 0.26 | — | +2.0 | 1.9 |
| Comparative example k | 50 | 125 | 25 | 30 | 155 | — | 0.24 | — | +5.0 | 0.4 |

From Table 3, it was found that in Comparative example i in which the thickness D2 of the transparent base 112-1 was an existing typical thickness (50 μm), and the thickness ΔDy of the skirt layer 112-5 was +2.0 μm, the large warpage was generated. Therefore, in the past, to decrease the warpage of the lens film 112, the thickness D2 of the transparent base 112-1 was thick as in Comparative example k.

Meanwhile, in the examples, by practically eliminating the skirt layer by setting the thickness ΔDy of the skirt layer to +0.25 μm as in Example h, or by totally eliminating the skirt layer by setting the thickness ΔDy of the skirt layer to +0.0 μm as in Example g, the warpage could be eliminated without making the thickness D2 of the transparent base 12A1 (13A1) thin. Further, for example, by setting the depth (−ΔDx) of the depression 12B5 (13B5) to −0.5 μm as in Example f or Example e, for example, the warpage could be eliminated without making the thickness D2 of the transparent base 12B1 (13B1) thick.

Further, in the examples, for example, as in Examples b, c, and d, by providing the depression 12B5 (13B5) and setting the thickness D2 of the transparent base 12B1 (13B1) thinner than the existing thickness (25 μm), the warpage could be eliminated. Then, in Example d, height H of the lens film 12B (13B) was lower than that of the existing height, and the height D3 of the pole prism 12B2 (13B2) and the pitch of the pole prism 12B2 (13B2) were increased. Therefore, the front luminance could be increased without increasing the height H of the lens film 12B (13B) than the existing height. Further, in Example b, since the height D3 of the pole prism 12A2 or the like and the pitch of the pole prism 12B2 (13B2) were decreased, the lens film 12B (13B) could be thinner.

Further, in the examples, for example, as in Example a, by practically eliminating the skirt layer by setting the thickness ΔDy of the skirt layer to +0.28 μm and setting the thickness D2 of the transparent base 12A1 (13A1) thinner than the existing thickness (25 μm), the warpage could be eliminated.

The foregoing results will be summarized in view from the ratios (D1/D2, D3/D2). By adjusting D1, D2, and D3 to satisfy D1/D2≧−0.30 and D3/D2≧−0.30 and practically or totally eliminating the skirt layer, and further by providing the depression 12B5 (13B5), it is possible to make the total thickness of the lens film 12A or the like thin without generating warpage, and further to increase the front luminance.

While the invention has been described with reference to the embodiment and the examples, the invention is not limited to the embodiment and the like, and various modifications may be made.

For example, in the foregoing embodiment and the like, the lens film 12A or the like respectively has the triangle pole-shaped pole prism 12A2 or the like. For example, the lens film 12A or the like may have an aspherical microlens.

Further, in the foregoing embodiment and the like, the lens film 12A or the like has a condensing function. However, the lens film 12A or the like also has a diffusion function. In this case, micro projections may be provided on the rear face of the lens film 12A or the like, or the rear face of the lens film 12A or the like may be coated with a diffusion material. Otherwise, the lens film 12A or the like itself may contain a diffusion material. Otherwise, a diffusion sheet or a diffusion plate may be glued on the surface of the lens film 12A or the like.

Further, in the foregoing embodiment and the like, the lens film 12A or the like is respectively arranged so that light of the light source 11 enters from the transparent base 12A1 or the like side. However, it is possible that in another display apparatus, the lens film 12A or the like may be arranged so that light of the light source enters from the side opposite to the transparent base 12A1 or the like, that is, from the pole prism 12A2 or the like side.

Further, in the foregoing embodiment and the like, by adjusting the thickness of the hardening resin P dropped on the transparent base S by the resin supply device 33 to a given thickness by the film thickness adjustment device 34, the transparent base S is coated with the uncured hardening resin P. However, the uncured hardening resin P may be arranged on the transparent base S by other method. For example, the transparent base S previously coated with the uncured hardening resin P may be provided in the unwinding device 31. Otherwise, it is possible that the surface of the forming roll 35C is previously coated with the uncured hardening resin P, the resultant is pressed by the pressure roll 35A, and thereby the uncured hardening resin P is in contact with the transparent base S. Otherwise, by providing a pool of the uncured hardening resin P by dropping the uncured hardening resin P in a cone-shaped region formed between the surface of the forming roll 35C and the surface of the transparent base S, the transparent base S may be coated with the uncured hardening resin P.

In the foregoing embodiment and the like, the structure of the display apparatus 1 has been concretely described. However, it is not necessary to provide all layers. In addition, other layer (for example, reflective polarizing plate) may be provided. That is, various selections may be made according to the usage and the purpose.

Further, in the foregoing embodiment and the like, the active matrix type display apparatus 1 has been described. However, the invention can be applied to a simple matrix-driven display apparatus.

Further, in the foregoing embodiment and the like, the case that the illumination system 10 is an edge-light type has been described. However, the illumination system may be other type such as a subjacent type. Further, in the foregoing embodiment and the like, the liquid crystal display apparatus 1 has been described. However, it is needless to say that the invention can be applied to display apparatuses utilizing other principle.

It should be understood by those skilled in the art that various modifications, combinations, sub-combinations and alternations may occur depending on design requirements and other factors insofar as they are within the scope of the appended claims or the equivalents thereof.

The invention claimed is:

1. An optical sheet having pole prisms made of a hardening resin arranged along an extending direction on a transparent base made of a flexible material, wherein
the transparent base is adjacent to a valley between the pole prisms adjacent to each other and has a depression corresponding to the valley.

2. The optical sheet according to claim 1, wherein the pole prisms have a sloping face extending to an inner wall of the depression.

3. The optical sheet according to claim 1, wherein the transparent base has a convex curved face between the valleys adjacent to each other.

4. The optical sheet according to claim 1, wherein the depression has a depth of about 10% or less of a thickness of the transparent base.

5. The optical sheet according to claim 1, wherein the depression has a depth of 4.31 μm or less.

6. An optical sheet having pole prisms made of a hardening resin arranged along an extending direction on a transparent base made of a flexible material, wherein
the transparent base has a depression corresponding to a valley of the pole prisms, and
where a depth of the valley is D1 and a thickness of the transparent base is D2, D1 and D2 satisfy the following relation:

$0.3 \leq D1/D2$.

7. The optical sheet according to claim 6, wherein the thickness of the transparent base D2 is 50 μm or less.

8. The optical sheet according to claim 6, wherein a height of the optical sheet is 65.3 μm or less.

9. An optical sheet having pole prisms made of a hardening resin arranged along an extending direction on a transparent base made of a flexible material, wherein
the transparent base is adjacent to a valley of the pole prisms and
where a thickness of the transparent base is D2, a height of the pole prism is D3 and a height of the optical sheet is H, D2, D3 and H satisfy the following relation:

$H \leq 65.2$ μm, $0.3 \leq D3/D2$.

* * * * *